United States Patent [19]
Sato et al.

[11] Patent Number: 5,574,762
[45] Date of Patent: Nov. 12, 1996

[54] METHOD AND APPARATUS FOR DIRECTIONAL COUNTING OF MOVING OBJECTS

[75] Inventors: Atsushi Sato; Megumu Tsuchikawa; Akira Tomono; Kenichiro Ishii, all of Kanagawaken, Japan

[73] Assignee: Nippon Telegraph And Telephone Corp., Tokyo, Japan

[21] Appl. No.: 522,196

[22] Filed: Aug. 31, 1995

[30]  Foreign Application Priority Data

Aug. 31, 1994   [JP]   Japan .................................. 6-206320

[51] Int. Cl.$^6$ .............................................. G06M 11/02
[52] U.S. Cl. .................................................. 377/6; 377/10
[58] Field of Search ............................................. 377/6, 10

[56] References Cited

U.S. PATENT DOCUMENTS 5,250,941   10/1993   McGregor et al. ................. 340/825.65

FOREIGN PATENT DOCUMENTS 4-120682   4/1992   Japan .

OTHER PUBLICATIONS

Mase, Sato, Suenga and Ishii, A Fast Object Flow Estimation Method Based on Spacetime Image Analysis dated Dec. 7–9, 1992, from *IAPR Workshop on Machine Vision Applications*.

*Primary Examiner*—Margaret Rose Wambach
*Attorney, Agent, or Firm*—Banner & Allegretti, Ltd.

[57]  ABSTRACT

A scheme for directional counting of moving objects capable of counting moving objects stably while determining passing directions of the moving objects accurately. In this scheme, a counting line is set in an image field of the sequential images, and a dynamic image formed by pixels forming the counting line is obtained for each frame and while a succesively updated background image is obtained. Then, a subtraction and binarization processing are applied to the dynamic image and the background image to extract a moving object region, and a moving object image is formed by sequentially labeling the moving object region in time order. Then, a number of moving objects passing through a monitoring target location is counted according to the moving object image, while upper and lower direction judgement regions are set above and below the counting line and a passing direction of each moving object is determined by judging one of the upper and lower direction judgement regions in which the moving object is present at a time of a formation start/end time of the moving object image.

20 Claims, 11 Drawing Sheets

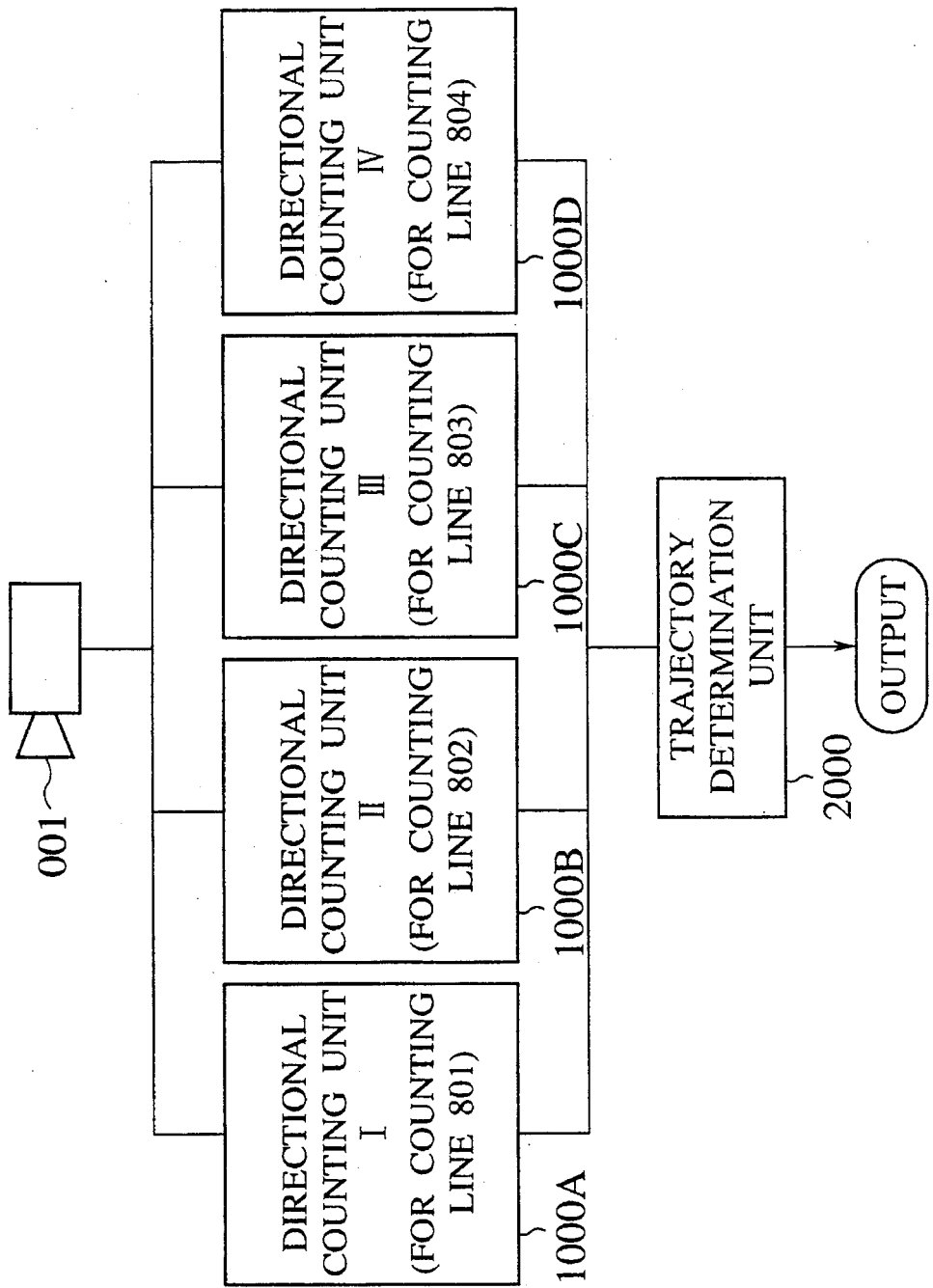

METHOD AND APPARATUS FOR DIRECTIONAL COUNTING OF MOVING OBJECTS

BACKGROUND OF THE INVENTION

1. Field of the Invention

The present invention relates to a count processing scheme utilizing an image processing for counting moving objects such as pedestrians passing through a pathway, a corridor, or a doorway, automobiles passing through a road, or objects moving over a belt conveyer, etc., and more particularly to a scheme for directional counting of moving objects which counts the moving objects direction by direction stably.

2. Description of the Background Art

As a scheme for directional counting of moving objects utilizing an image processing, the following schemes are conventionally known.

(1) A scheme in which corresponding object images are identified in sequential frames of the dynamic image, and the counting is made according to a number of identified object images and their trajectories.

(2) A scheme in which two monitoring lines are provided in an image field, and the counting is made according to an order of changes in the pixel values of the object images passing over each line.

(3) A scheme in which the counting is made by a region counting and a shape analysis of moving object extraction results using a space-time image obtained from a single counting line, as disclosed in Japanese Patent Application Laid Open No. 4-120682 (1992).

However, these conventionally known schemes are associated with the following problems.

The count processing according to the above scheme (1) requires a complicated processing in order to make correspondences of the objects among a number of images, so that it is very difficult to realize a real time processing.

The count processing according to the above scheme (2) is a frequently utilized one which is based on a similar operation principle as a mechanical counting device or a counting device using photo-electric tubes. However, in this scheme, when the pedestrians are passing continuously, there arises a situation in which different pedestrians are present on two monitoring lines at the same time, in which case the pixel values for these two monitoring lines do not change in the same order as in a case of only one pedestrian passing over these two monitoring lines and the expected changes in the pixel values disappear to make it impossible to detect any order of changes in the pixel values, such that it becomes impossible to judge the moving directions of the pedestrians.

In addition, in order to judge a moving direction in this scheme, it is necessary to observe the changes in the pixel values for these two monitoring lines at three timings of a time at which the pedestrian is on one of the monitoring lines, a time at which the pedestrian is on both of the monitoring lines, and a time at which the pedestrian is on another one of the monitoring line, so that it requires a considerable time in judging a moving direction.

Moreover, the moving directions that can be judged in this scheme are limited to two types of moving in and moving out for example.

The count processing according to the above scheme (3) is a scheme in which a pathway is imaged from above by a camera at an angle, and a two dimensional space-time image is formed from pixels on a line obliquely crossing the pathway in the images by using a space axis and a time axis, and then a moving object image is extracted from the space-time image and a moving direction is judged from an inclination of the extracted moving object image, so that it has an advantage that it can count the moving objects at high speed by a relatively simple processing while also obtaining motion vectors.

However, at a location where the flow of pedestrians changes (such as a doorway of a hall or an exhibition room at which dispersion/contraction of the flow occurs), or at a location where the camera cannot be placed sufficiently above, an inclination of a moving object image does not necessarily indicate a passing direction of a pedestrian, so that this scheme is prone to errors in the moving direction judgement in such circumstances.

In addition, according to this scheme, it is also possible to detect a passing speed of a moving object from a size of an inclination of a moving object image in a case a passing direction can be judged, but when the moving objects have different sizes themselves, the detected passing speed may contain a large error.

Moreover, under a circumstance in which a passing direction cannot be judged, it is also impossible to detect a passing speed.

Thus, presently, only a few algorithms are available for directional counting based on an image recognition, and there has been no counting scheme which can be accurate even under an environment involving many moving objects and diverse moving directions.

SUMMARY OF THE INVENTION

It is therefore an object of the present invention to provide a method and an apparatus for directional counting of moving objects capable of counting moving objects direction by direction stably, even under an environment involving many moving objects and diverse moving directions, i.e., an environment with disturbed moving object flow in which the moving directions are not fixed.

It is another object of the present invention to provide a method and an apparatus for directional counting of moving objects capable of classifying moving directions in dispersing/contracting flow of moving objects into multiple directions, by means of a simple algorithm.

It is another object of the present invention to provide a method and an apparatus for directional counting of moving objects capable of also obtaining a passing speed of a moving object stably, regardless of a size of a moving object or a location environment, by means of a simple algorithm.

According to one aspect of the present invention there is provided a method for directional counting of moving objects at a prescribed monitoring target location, comprising the steps of: (a) taking sequential images of the prescribed monitoring target location; (b) setting a counting line in an image field of the sequential images, and acquiring a dynamic image formed by time changing pixel values of a series of pixels forming the counting line from each sequential image; (c) obtaining a background image by successively updating the pixel values of the series of pixels forming the counting line in states in which a moving object is not passing over the counting line; (d) applying a subtraction processing on the dynamic image and the background image, and then applying a binarization processing to extract a moving object region; (e) forming a moving object image by sequentially labeling moving object region in time order; (f) counting a number of moving objects passing through the prescribed monitoring target location according to the moving object image; and (g) setting upper and lower direction judgement regions above and below the counting line in the image field of the sequential images, and judging a passing direction of each moving object by judging one of the upper and lower direction judgement regions in which the moving object is present at a time of a formation start/end time of the moving object image.

According to another aspect of the present invention there is provided an apparatus for directional counting of moving objects at a prescribed monitoring target location, comprising: imaging means for taking sequential images of the prescribed monitoring target location; dynamic image acquisition means for setting a counting line in an image field of the sequential images, and acquiring a dynamic image formed by time changing pixel values of a series of pixels forming the counting line from each sequential image; background image reconstruction means for obtaining a background image by successively updating the pixel values of the series of pixels forming the counting line in states in which a moving object is not passing over the counting line; moving object region extraction means for applying a subtraction processing on the dynamic image and the background image, and then applying a binarization processing to extract a moving object region; moving object image formation means for forming a moving object image by sequentially labeling the moving object region in time order; counting means for counting a number of moving objects passing through the prescribed monitoring target location according to the moving object image; and passing direction judgement means for setting upper and lower direction judgement regions above and below the counting line in the image field of the sequential images, and judging a passing direction of each moving object by judging one of the upper and lower direction judgement regions in which the moving object is present at a time of a formation start/end time of the moving object image.

Other features and advantages of the present invention will become apparent from the following description taken in conjunction with the accompanying drawings.

BRIEF DESCRIPTION OF THE DRAWINGS

FIG. 13 is a block diagram of an apparatus realizing a method for directional counting of moving objects according to the fifth embodiment of the present invention.

DETAILED DESCRIPTION OF THE PREFERRED EMBODIMENTS

Figure 1:
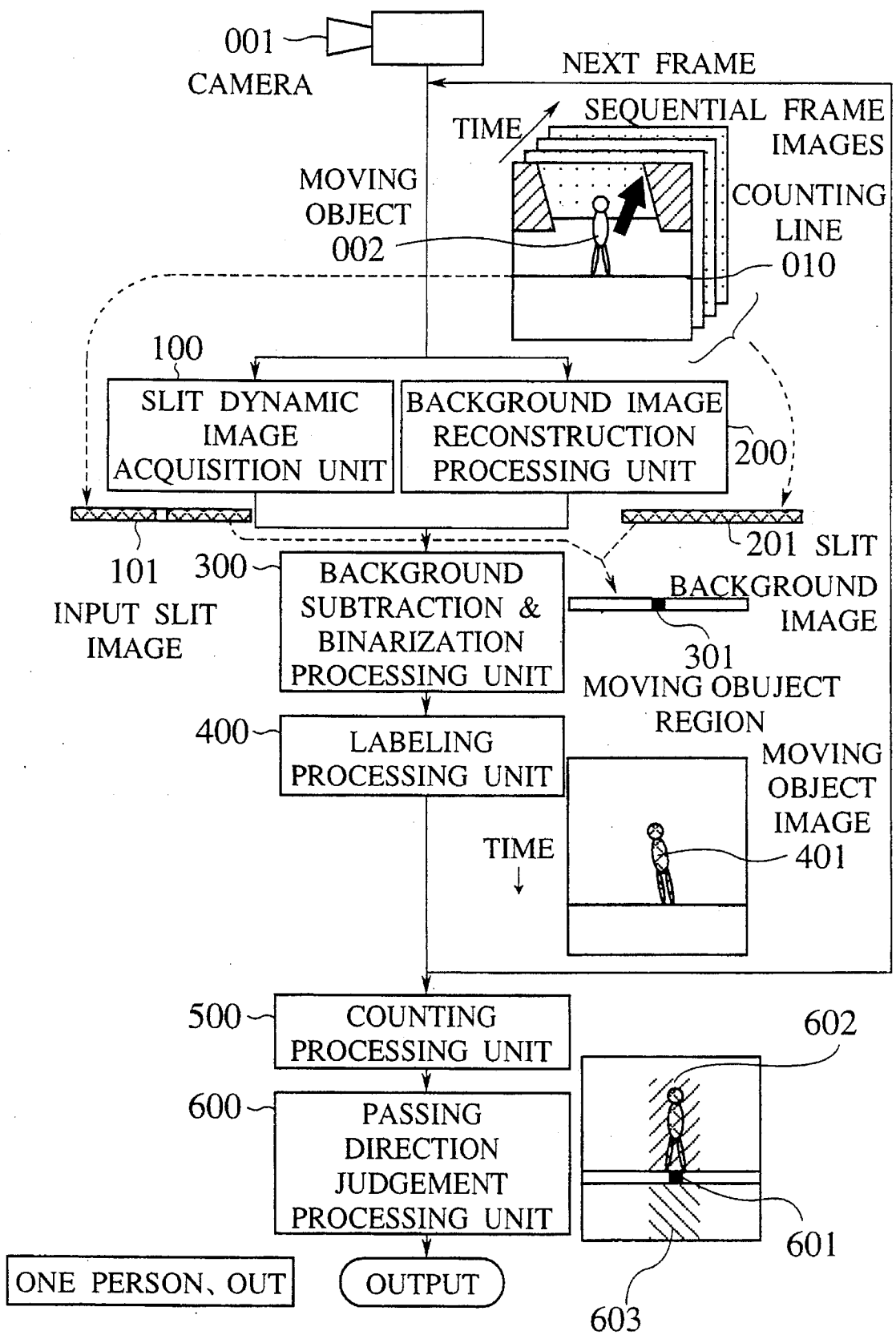
FIG. 1 is a block diagram of an apparatus realizing a method for directional counting of moving objects according to the first embodiment of the present invention.

Referring now to FIG. 1, the first embodiment of a method and an apparatus for directional counting of moving objects according to the present invention will be described in detail.

In this embodiment, the apparatus has a configuration as shown in FIG. 1, which comprises: a camera 001 for taking sequential frame images of a prescribed monitoring target location containing a moving object 002; a slit dynamic image acquisition unit 100 for setting a counting line 010 in the sequential frame images and acquiring an input slit image 101 from the counting line 010; a background image reconstruction processing unit 200 for successively updating a slit background image 201 for the counting line 010; a background subtraction and binarization processing unit 300 for applying a subtraction processing on the input slit image 101 and the slit background image 201 and applying a binarization processing on a subtraction result to obtain a subtracted and binarized image containing a moving object region 301; a labeling processing unit 400 for sequentially labeling the moving object region in time order (i.e., forming a connected region from sequentially obtained moving object regions) to obtain a space-time image containing a moving object image 401; a counting processing unit 500 for counting the moving object according to the moving object image 401 at a time of moving object passing; and a passing direction judgement processing unit 600 for judging a passing direction of the moving object by using upper and lower direction judgement regions 602 and 603 set above and below a moving object region 601 at a time of moving object passing within the counting line 010 in a real space image of the prescribed monitoring target location at a time of moving object passing.

Now, the operation of this apparatus of FIG. 1 will be described.

The camera 001 takes the sequential frame images of the prescribed monitoring target location showing a motion of the moving object 002. Here, this camera 001 may be a color camera if desired, but it is assumed to be a monochromatic camera here for simplicity.

Then, the slit dynamic image acquisition unit 100 sets the counting line 010 in the image field of the sequential frame images, and obtains the input slit image (dynamic image) 101 by extracting time changing pixel values of a series of pixels forming the counting line 010 from the sequential frame images. Here, the counting line 010 is in a form of a continuous straight line as shown in FIG. 1, but it is also possible to obtain the input slit image 101 by suitably sampling the pixel values timewise, or spacewise, or both timewise and spacewise.

On the other hand, the background image reconstruction processing unit 200 obtains the slit background image 201 to be used in the background subtraction, by successively updating the pixel values of a series of pixels forming the counting line 010 in states in which a moving object is not passing over the counting line 010, from the sequential frame images. Here, a method of background image reconstruction used by this background image reconstruction processing unit 200 can be that disclosed in Japanese Patent Application No. 7-29220 (1995) for example, in which a new background value is calculated from a statistical feature of a time change of an intensity value for each pixel constituting the background image, and a pixel value of each pixel in the background image is replaced by a newly calculated background value.

Then, the background subtraction and binarization processing unit 300 applies the subtraction processing on the input slit image 101 and the slit background image 201 and applies a binarization processing on the subtraction result, at each pixel in each frame, to extract the moving object region 301.

Then, the labeling processing unit 400 sequentially labels a series of moving object regions 301 obtained from sequential frames in time order, i.e., forms a connected region from sequentially obtained moving object regions, to obtain a space-time image containing the moving object image 401.

Then, the counting processing unit 500 detects a time of moving object passing by receiving a labeling finish notice indicating an end of the labeling for each moving object image 401 from the labeling processing unit 400, and counts the moving object each time the moving object passes. Here, the counting of the moving objects can be realized by calculating a number of moving objects contained in the labelled moving object image as an area of the labelled moving object image (a number of pixels contained in the labelled moving object image) divided by a predetermined reference value (a unit area such as an average area of the moving object image for a case of having only one moving object passing), i.e., calculating a number of moving objects=(labelled moving object image area)/(reference value). Under a condition that the moving objects do no pass in aggregation, it is also possible to realize this counting of the moving objects by simply counting a number of labelled moving object images.

Then, the passing direction judgement processing unit 600 judges a passing direction of each moving object as follows.

Namely, in a real space image for a frame at a time of moving object passing as indicated by the end of labeling, the passing direction judgement processing unit 600 sets the upper and lower direction judgement regions 602 and 603 above and below the counting line 010 containing the moving object region 601 at a time of moving object passing, and extracts a moving object region in each of these upper and lower direction judgement regions 602 and 603 by the subtraction and binarization processing similar to that used in the background subtraction and binarization processing unit 300. Then, the passing direction judgement processing unit 600 judges one of the upper and lower direction judgement regions 602 and 603 in which the moving object is present according to a presence/absence of a continuity between the moving object region 601 and the moving object regions extracted from the upper and lower direction judgement regions 602 and 603. The passing direction of the moving object is then judged as a direction toward that one of the upper and lower direction judgement regions 602 and 603 in which the moving object is judged to be present. In an exemplary case depicted in FIG. 1, it is judged that the moving object has passed in a direction toward the upper direction judgement region 602.

By repeating the above operation successively with respect to the prescribed monitoring target location, and combining each counting result with each passing direction judgement result, a directional counting result is outputted. In an exemplary case depicted in FIG. 1, the directional counting result indicating that one person has moved out will be outputted.

It is to be noted that, the passing direction judgement processing unit 600 may judge the passing direction at a time of a start of labeling by the labeling processing unit 400, instead of a time of an end of labeling as described above. In this case, the passing direction judgement processing unit 600 similarly judges one of the upper and lower direction judgement regions 602 and 603 in which the moving object is present according to a presence/absence of a continuity between the moving object region 601 and the moving object regions extracted from the upper and lower direction judgement regions 602 and 603 at a time of a start of labeling, and the passing direction of the moving object is then judged as a direction opposite to that one of the upper and lower direction judgement regions 602 and 608 in which the moving object is judged to be present at a time of a start of labeling.

According to this first embodiment, the passing direction of the moving object is judged by searching a presence of the moving object region continuous from the counting line to upper or lower direction in a real space image at a time of moving object passing, so that even when there is not much time change in the moving object region on the counting line as a number of moving objects pass in aggregation, it is possible to judge the passing direction of the moving object accurately because the moving object exists in the real space image at a time of the moving object passing as a single continuous region. Moreover, even when a direction of the flow of the moving objects is not constant, it is unaffected by the change in the moving object extraction result on the counting line, so that it is possible to realize the accurate directional counting stably, without being affected by the flow of the moving objects.

Figure 2:
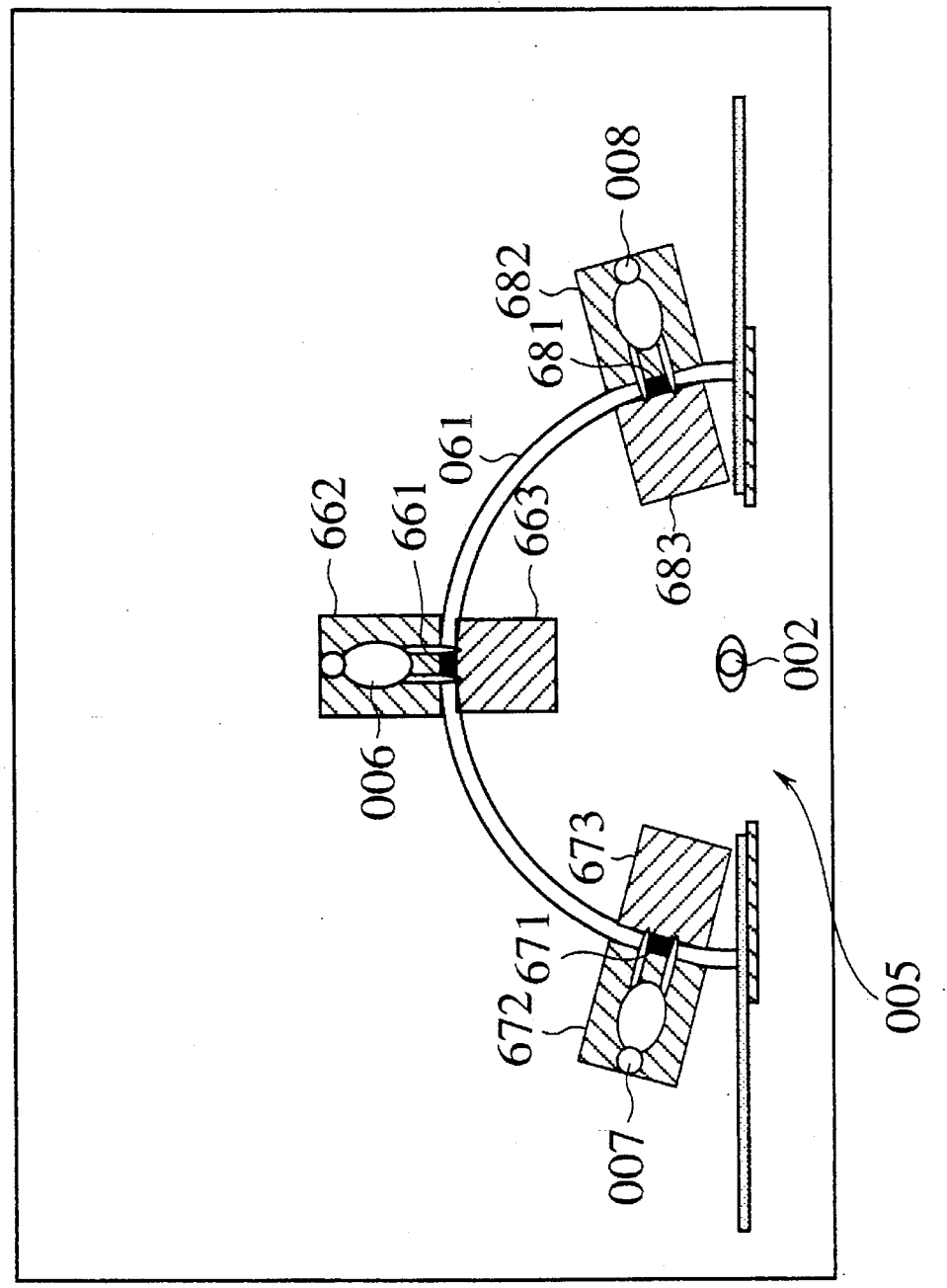
FIG. 2 is a figure for explaining one modification of the method for directional counting of moving objects in the first embodiment of the present invention.

Referring now to FIG. 2, one modification of the above described first embodiment will be explained.

FIG. 2 shows an exemplary image taken by the camera 001 when the camera 001 is placed directly above a doorway 005 of a hall, to illustrate a semi-circular counting line and the upper and lower direction judgment regions used in this modification. Here, FIG. 2 shows four moving objects 002, 006, 007, and 008 including a moving object 002 presently located near the doorway 005, a moving object 006 entered through the doorway 005 and moved straight ahead, a moving object 007 entered through the doorway 005 and turned to the left, and a moving object 008 entered through the doorway 005 and turned to the right.

In this modification, a semi-circular counting line 061 is provided such that the moving object regions 661, 671, and 681 are obtained for the moving objects 006, 007, and 008, respectively, and the upper and lower direction judgement regions 662 and 663, 672 and 673, and 682 and 683 are set with respect to the moving object regions 661, 671, and 681, respectively.

This modification differs from the first embodiment described above only in a manner of setting the counting line and the direction judgement regions, and the remaining features are substantially the same as in the first embodiment. Here, the counting line 061 is in a semi-circular shape centered around a central point of the doorway 005 such that the pedestrian entering through the doorway 005 passes over this counting line 061 without a failure, regardless of a direction into which the pedestrian proceeds through the doorway 005.

It is to be noted that this modification shows a case of using a curved line as the counting line in order to deal with diverse moving directions of the pedestrians, but it is also possible to use a curved line as the counting line in a case of having a distortion in the peripheral portion of the images due to a use of a wide angle lens in an optical system of the camera 001. In such a case, the counting line is set in a curved shape corresponding to the distortion due to the lens, such that the counting line appears as a curved line on the images but a projection of the counting line on a floor surface in a real space to be imaged would appear as a straight line.

Figure 3:
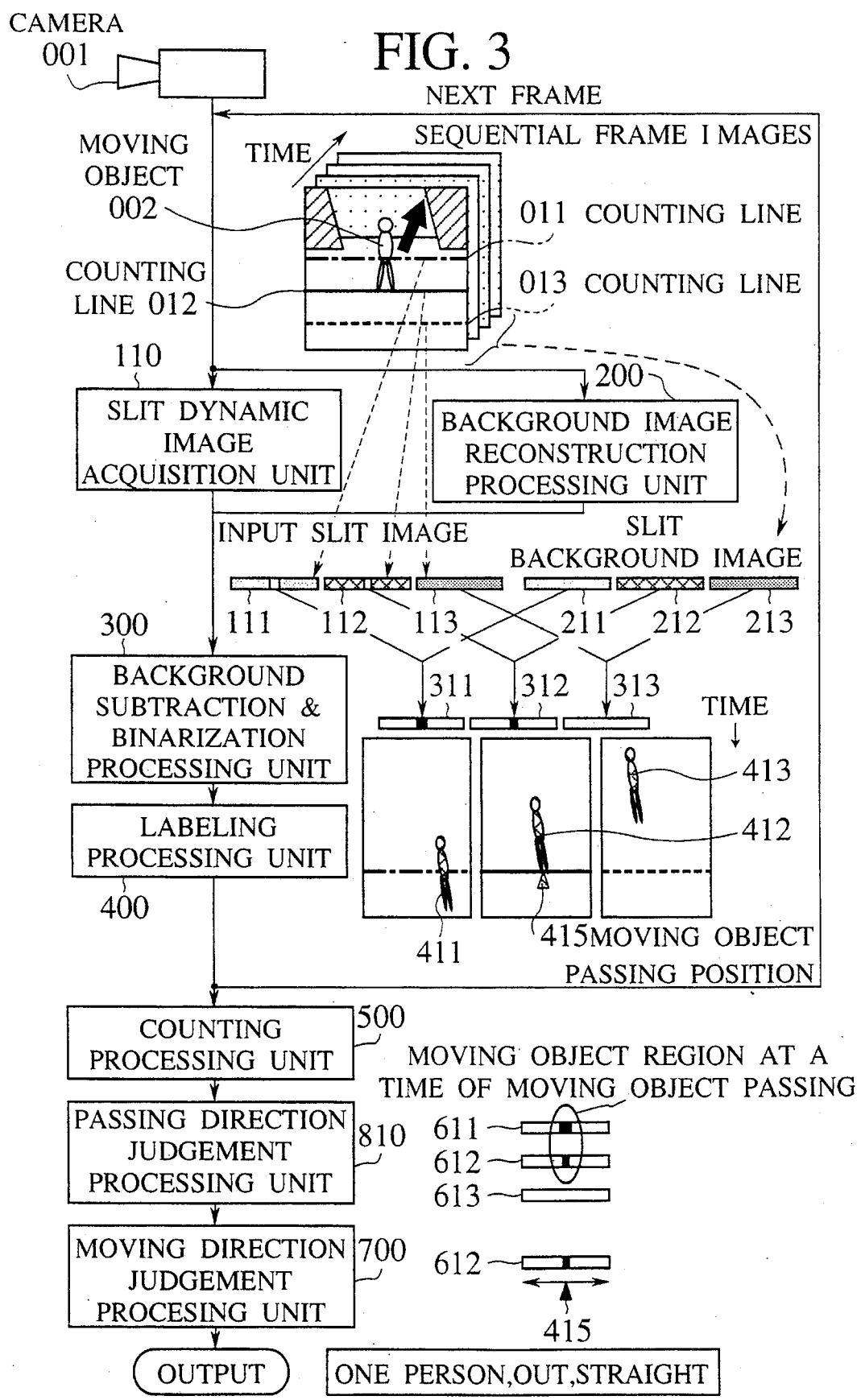
FIG. 3 is a block diagram of an apparatus realizing a method for directional counting of moving objects according to the second and third embodiments of the present invention.

Referring now to FIG. 3, the second embodiment of a method and an apparatus for directional counting of moving objects according to the present invention will be described in detail.

In this embodiment, the apparatus has a configuration as shown in FIG. 3, which comprises: a camera 001 for taking sequential frame images of a prescribed monitoring target location containing a moving object 002; a slit dynamic image acquisition unit 110 for setting three counting lines 011, 012, and 013 in the sequential frame images and acquiring input slit images 111, 112, and 113 from the counting lines 011, 012, and 013; a background image reconstruction processing unit 200 for successively updating slit background images 211, 212, and 213 for the counting lines 011, 012, and 013; a background subtraction and binarization processing unit 300 for applying a subtraction processing on each of the input slit images 111, 112, and 113 and each of the slit background images 211, 212, and 213 and applying a binarization processing on each subtraction result to obtain subtracted and binarized images 311, 312, and 313 containing moving object regions; a labeling processing unit 400 for sequentially labeling the moving object regions in time order (i.e., forming a connected region from sequentially obtained moving object regions) for each of the counting Lines 011, 012, and 013 to obtain space-time images containing moving object images 411, 412, and 413; a counting processing unit 500 for counting the moving object according to the moving object image 412 for a central counting line 012 at a time of moving object passing; and a passing direction judgement processing unit 610 for judging a passing direction of the moving object by using upper and lower counting lines 011 and 013 set above and below the central counting line 010 and subtracted and binarized images 611, 612, and 613 for these counting lines 011, 012, and 013.

This configuration of FIG. 3 also includes a moving direction judgement processing unit 700 to be used in the third embodiment described in detail below.

Now, the operation of this apparatus of FIG. 3 will be described.

The camera 001 takes the sequential frame images of the prescribed monitoring target location showing a motion of the moving object 002.

Then, the slit dynamic image acquisition unit 100 sets a counting line for counting purpose along with a plurality of other counting lines for direction judgement purpose above and below the counting line for counting. In an exemplary case shown in FIG. 3, the counting lines 012 for counting is set along with the counting lines 011 and 013 for direction judgement in the image field of the sequential frame images. The slit dynamic image acquisition unit 100 then obtains the input slit images (dynamic images) 111, 112, and 113 by extracting time changing pixel values of a series of pixels forming the counting lines 011, 012, and 013 from the sequential frame images.

On the other hand, the background image reconstruction processing unit 200 obtains the slit background images 211, 212, and 213 to be used in the background subtraction, by successively updating the pixel values of a series of pixels forming the counting lines 011, 012, and 013 in states in which a moving object is not passing over the counting lines 011, 012, and 013 from the sequential frame images. Here, as in the first embodiment described above, a method of background image reconstruction used by this background image reconstruction processing unit 200 can be that disclosed in Japanese Patent Application No. 7-29220 (1995) for example, in which a new background value is calculated from a statistical feature of a time change of an intensity value for each pixel constituting the background image, and a pixel value of each pixel in the background image is replaced by a newly calculated background value.

Then, the background subtraction and binarization processing unit 300 applies the subtraction processing on each of the input slit images 111, 112, and 113 and each of the slit background image 211, 212, and 213, and applies a binarization processing on each subtraction result, at each pixel in each frame, to obtain the subtracted and binarized images 311, 312, and 313 containing moving object regions. In an exemplary case shown in FIG. 3, the subtracted and binarized image 313 shows an absence of a moving object region.

Then, the labeling processing unit 400 sequentially labels a series of moving object regions obtained from sequential frames in time order, i.e., forms a connected region from sequentially obtained moving object regions, for each of the counting lines 011, 012, and 013, to obtain a space-time images containing the moving object images 411, 412, and 413.

Then, the counting processing unit 500 detects a time of moving object passing by receiving a labeling finish notice for the moving object region in the subtracted and binarized image 312 indicating an end of the labeling for the moving object image 412 from the labeling processing unit 400, and counts the moving object each time the moving object passes.

Then, the passing direction judgement processing unit 610 judges a passing direction of each moving object as follows.

Namely, at a time of moving object passing as indicated by the end of labeling, the passing direction judgement processing unit 600 obtains a passing position 415 of the moving object from the subtracted and binarized image 612 for the central counting line 012. Here, it is possible to determine in advance an inclination in a real space image that a moving object vertical to a floor surface in a real space at the passing position 415 is going to have, so that by using predetermined intersections of a straight line passing through the passing position 415 and having that inclination with the upper and lower counting lines 011 and 013 in the real space image, each of the subtracted and binarized images 611 and 613 for the upper and lower counting lines 011 and 013 is checked in a range corresponding to a standard width of a moving object and centered around the intersection on a respective counting line. Then, the passing direction judgement processing unit 610 judges one of the upper and lower counting lines 011 and 013 in which the moving object is present continuously from the moving object region in the subtracted and binarized image 612 for the central counting line 012. The passing direction of the moving object is then judged as a direction toward that one of the upper and lower counting lines 011 and 013 in which the moving object is judged to be present.

Figure 4:
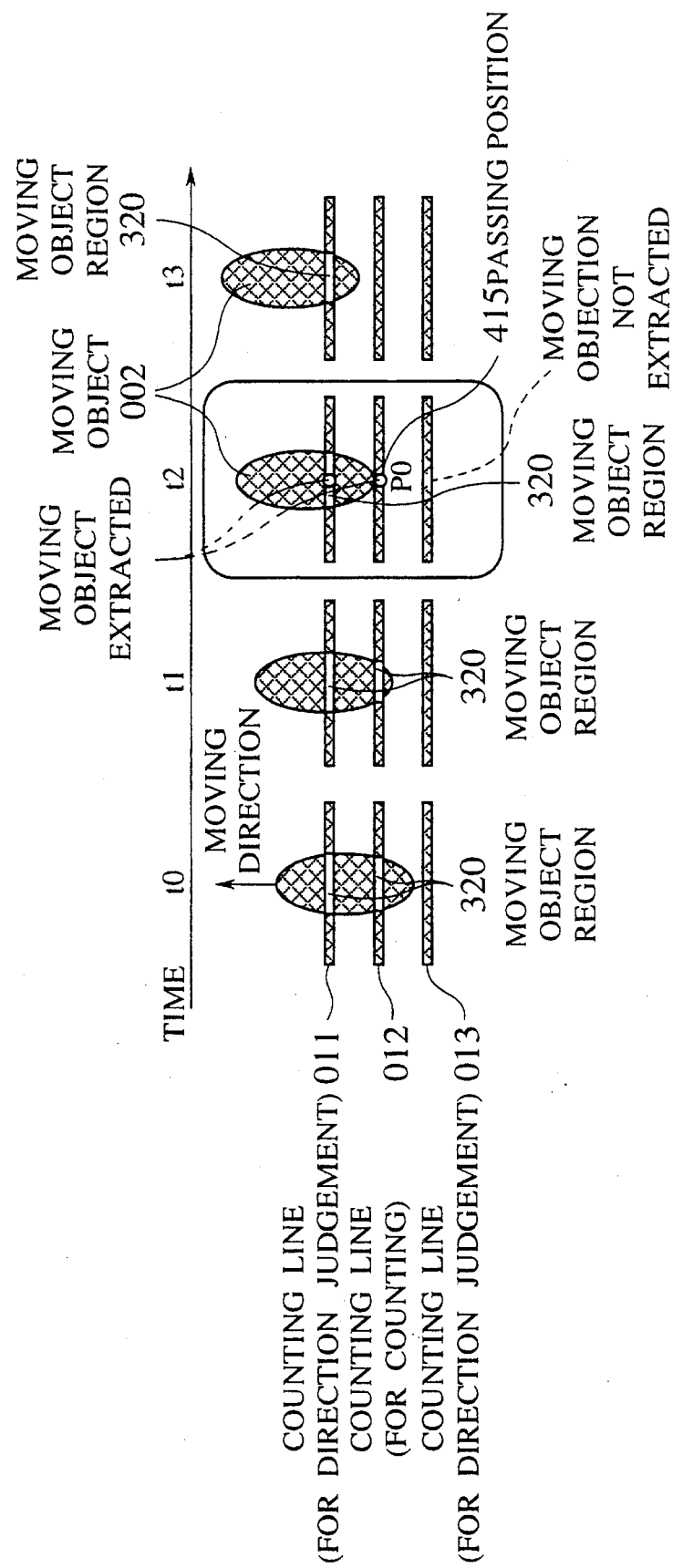
FIG. 4 is a figure for explaining a procedure for judging a passing direction of a moving object in the method for directional counting of moving objects according to the second embodiment of the present invention.

For example, in an exemplary case shown in FIG. 4 in which the counting line 012 for counting is set in a middle of an image field while the upper and lower counting lines 011 and 013 are set above and below the central counting line 012, a passing direction of the moving object 002 having a certain size and moving from below toward above can be judged as follows. Namely, at a time t2 of the moving object passing at which the moving object 002 passes the central counting line 012 at the passing position 415 (point P0), the moving object region 320 can be extracted from the upper counting line 011 while no moving object region can be extracted from the lower counting line 013, so that it can be judged that this moving object 002 is moving toward above.

In this manner, in an exemplary case depicted in FIG. 3, it is judged that the moving object has passed in a direction toward the upper counting line 011, and the directional counting result indicating that one person has moved out will be outputted.

According to this second embodiment, because of the use of the upper and lower counting lines for the directional judgement purpose, it is possible to realize a high speed directional counting by a simple processing accurately, and it is suitable for a hardware implementation so that even faster implementation to realize a real time processing is also possible.

Figure 5:
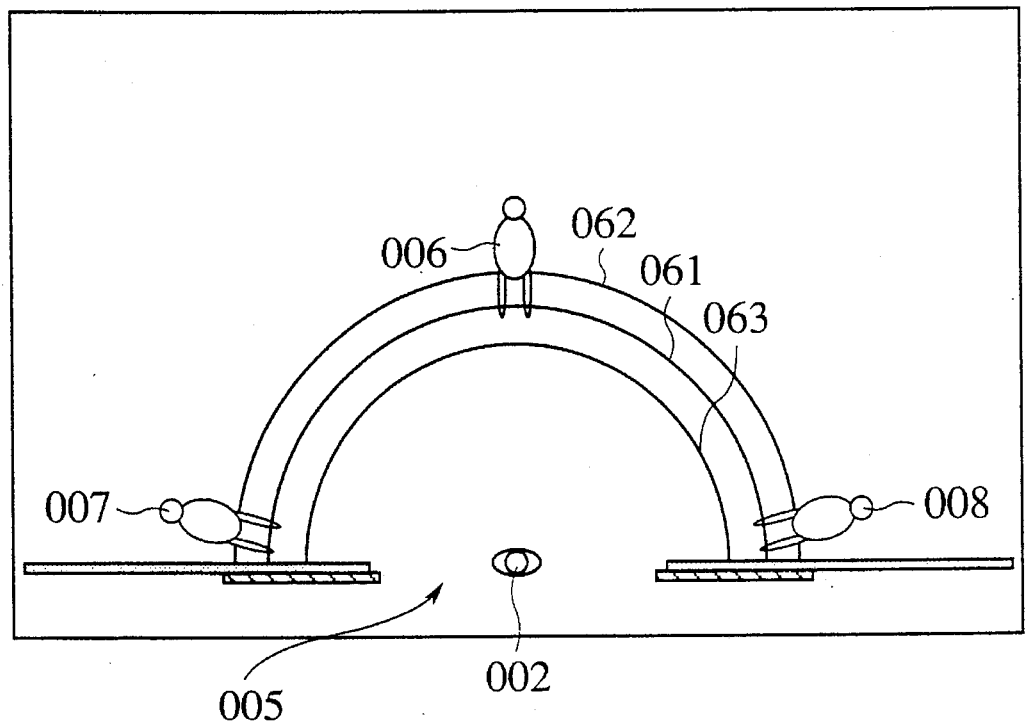
FIG. 5 is a figure for explaining one modification of the method for directional counting of moving objects in the second embodiment of the present invention.

Referring now to FIG. 5, one modification of the above described second embodiment will be explained.

FIG. 5 shows an exemplary image taken by the camera 001 when the camera 001 is placed directly above a doorway 005 of a hall, to illustrate semi-circular counting lines and the upper and lower direction judgment regions used in this modification. Here, FIG. 5 shows four moving objects 002, 006, 007, and 008 including a moving object 002 presently located near the doorway 005, a moving object 006 entered through the doorway 005 and moved straight ahead, a moving object 007 entered through the doorway 005 and turned to the left, and a moving object 008 entered through the doorway 005 and turned to the right.

In this modification, three semi-circular counting line 061,062, and 063 are provided instead of the three straight line shaped counting lines of the second embodiment, while remaining features are substantially the same as in the second embodiment. Here, the counting lines 061, 062, and 063 are semi-circular shapes coaxially centered around a central point of the doorway 005 such that these counting lines 061, 062, and 063 intersects perpendicularly with a central line of the pedestrian image after the pedestrian entering through the doorway 005 has proceeded for a certain distance.

Figure 6:
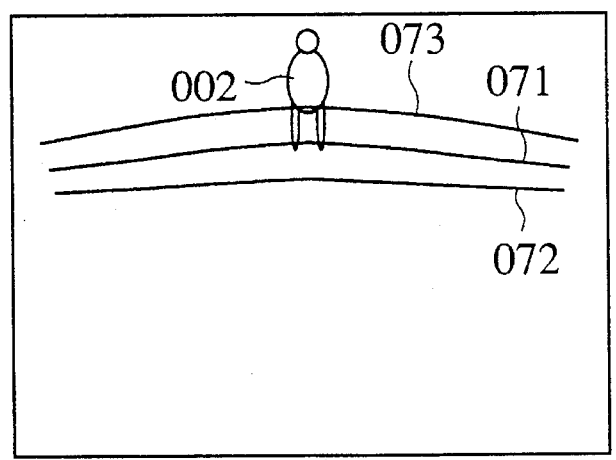
FIG. 6 is a figure for explaining another modification of the method for directional counting of moving objects in the second embodiment of the present invention.

Referring now to FIG. 6, another modification of the above described second embodiment will be explained.

FIG. 6 shows an exemplary image taken by the camera having a distortion in the peripheral portion of the images due to a use of a wide angle lens in an optical system of the camera.

In this modification, the counting lines 071, 072, and 073 are set in curved shapes corresponding to the distortion due to the lens, such that the counting lines appears as curved lines on the images but projections of these counting lines on a floor surface in a real space to be imaged would appear as straight lines. The remaining features are substantially the same as in the second embodiment.

Figure 7:
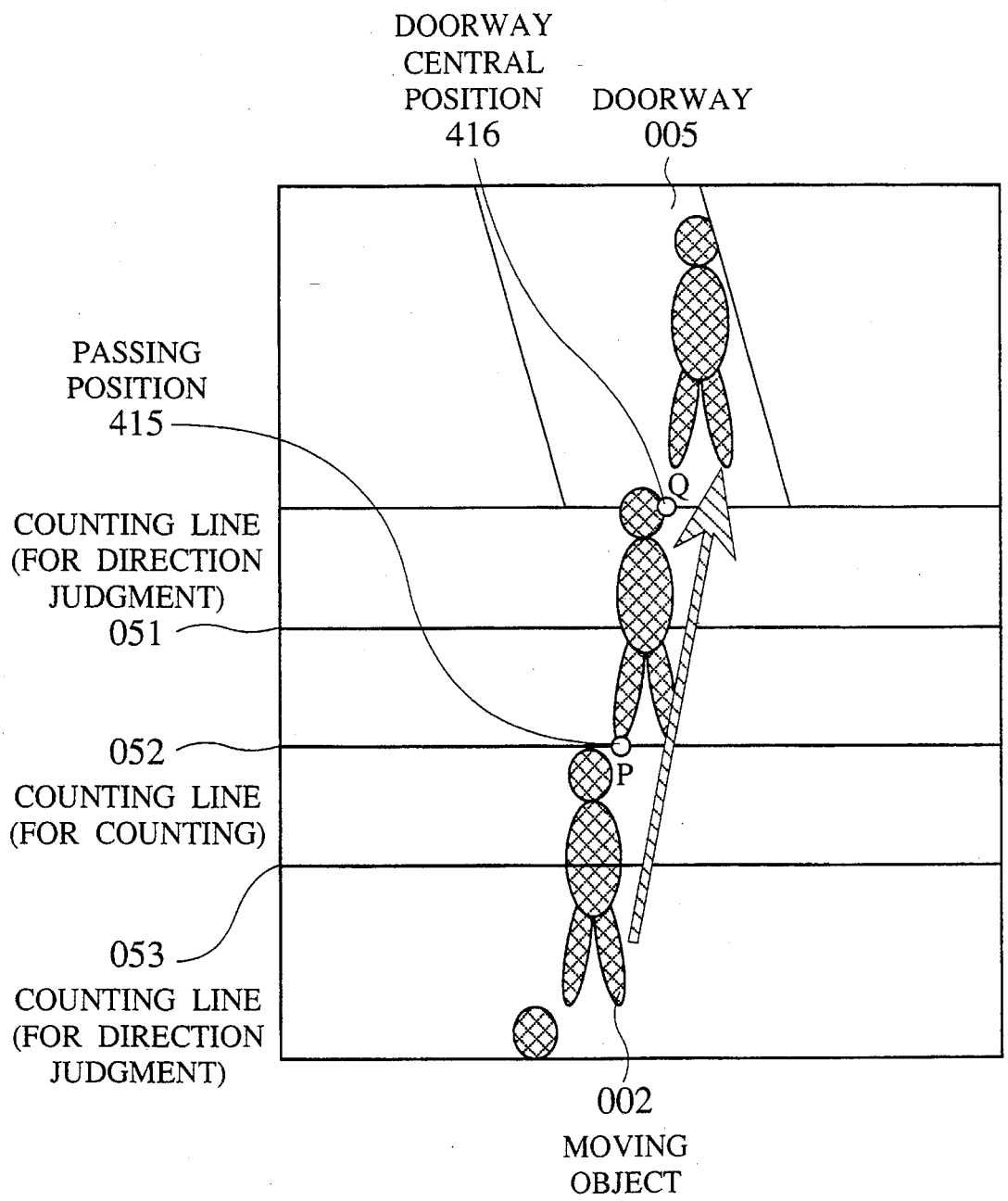
FIG. 7 is a figure for explaining one example of a procedure for judging a passing direction of a moving object in the method for directional counting of moving objects according to the third embodiment of the present invention.
Figure 8:
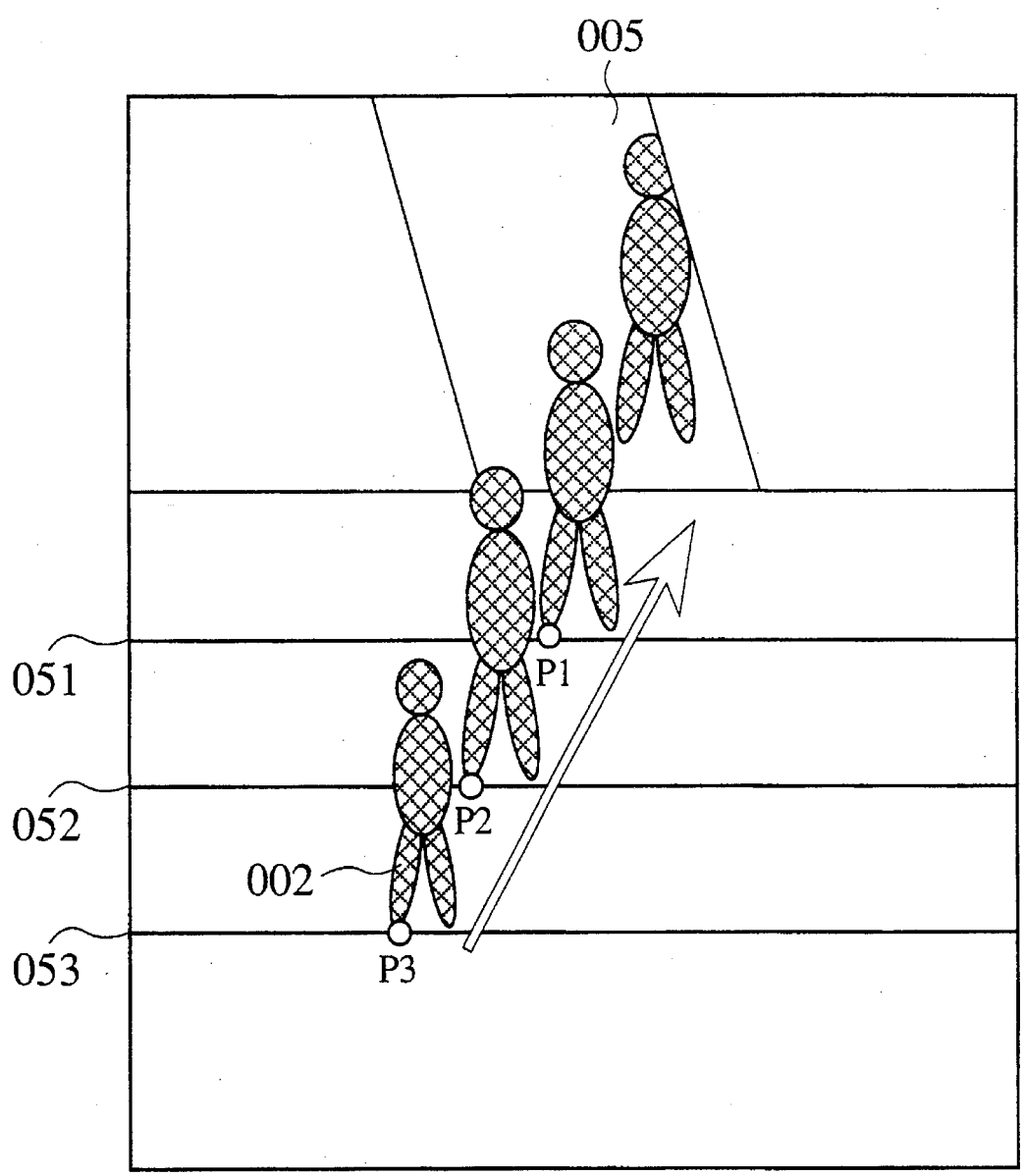
FIG. 8 is a figure for explaining another example of a procedure for judging a passing direction of a moving object in the method for directional counting of moving objects according to the third embodiment of the present invention.

Referring now to FIGS. 7 and 8, the third embodiment of a method and an apparatus for directional counting of moving objects according to the present invention will be described in detail.

In this embodiment, the apparatus has a configuration as shown in FIG. 3 described above, including a moving direction judgement processing unit 700 for judging a moving direction of the moving object 002 after the moving object 002 has passed the counting lines according to the passing position 415 of the moving object 002. The remaining features are substantially the same as in the second embodiment and their explanation will not be repeated.

Here, the operation of the moving direction judgement processing unit 700 will be described.

Namely, in an exemplary case shown in FIG. 7 in which there is a dispersion/contraction of the flow of the moving objects such as pedestrians passing over the counting lines 051, 052, and 053 and moving in and out of a narrow doorway 005, the moving direction of each moving object 002 can be approximated as a line joining the passing position 415 (point P) of the moving object 002 on the central counting line 052 which is obtained whenever the moving object 002 passes through the doorway 005 and a central position 416 (point Q) of the doorway 005 that can be determined in advance, so that in combination with the passing direction judgement result indicating whether the moving object has passed toward above or below that is obtained as in the second embodiment, it is possible to judge a variety of moving directions.

In the above, a case in which a central position of the dispersion/contraction of the flow of the moving objects (a convergence position of the flow of the moving objects) can be specified in advance has been described, but in a case such a central position cannot be specified in advance, as shown in FIG. 8, it is still possible to judge the moving direction as a line joining three passing positions (points P1, P2, and P3) of each moving object 002 on three counting lines 051, 052, and 053, just as in a case of FIG. 7 described above.

Figure 9:
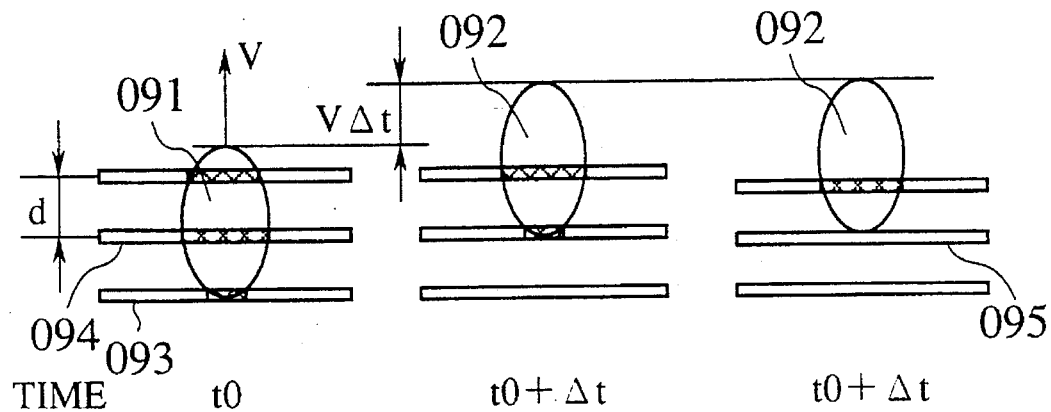
FIG. 9 is a figure for explaining a counting line interval in the method for directional counting of moving objects according to the second and third embodiment of the present invention.

In exemplary cases shown in FIGS. 7 and 9, it can be judged that the moving object 002 is moving in a direction of an arrow, and the directional counting result is that one person has moved out straight through the doorway 005.

According to this third embodiment, it is possible to judge a moving direction of each moving object easily by measuring the passing direction of the moving object at a time of passing over the counting line, in addition to a number and passing directions of the moving objects.

Next, with references to FIGS. 9 and 10, an appropriate interval between the counting lines in the second and third embodiments described above will be explained.

Figure 10:
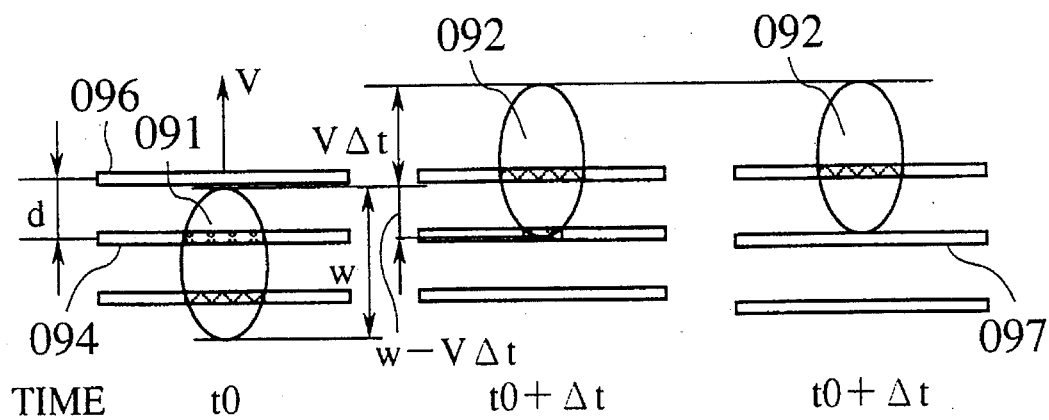
FIG. 10 is another figure for explaining a counting line interval in the method for directional counting of moving objects according to the second and third embodiment of the present invention.

FIGS. 9 and 10 shows a pedestrian image 091 at a time t0 and a pedestrian image 092 at a time t0+Δt in two possible cases, where Δt is a time interval for taking successive ones of the sequential frame images, and 093, 094, 095, 096, and 097 are the counting lines. Here, an average speed of the pedestrians in the image field is set to be V, an average width of the pedestrians along a moving direction which is perpendicular to the counting lines is set to be w, and an interval between the counting lines is set to be d.

Now, in FIG. 9, while the time elapse from a time t0 to a time t0+Δt, the pedestrian image has changed from 091 to 092, by moving for a length VΔt on the image field. If the pedestrian at a time t0 was about to pass through the lower counting line 093, in order to make the passing direction judgement correctly, it is necessary for the pedestrian image 092 at a time t0+Δt to be on the central counting line 094 as shown in a middle part of FIG. 9.

To this end, it is necessary for the interval d of the counting lines to be greater than the moving distance VΔt of the pedestrian image. This is because, if the interval d of the counting lines is less than VΔt, as shown in a right part of FIG. 9, the pedestrian image 092 at a time t0+Δt would be off the central counting line 095 such that it would be impossible to capture an instance at which the pedestrian is simultaneously on the central counting line and either one of the upper and lower counting lines, so that there is a possibility for making an error in the direction judgement.

On the other hand, in FIG. 10, while the time elapse from a time t0 to a time t0+Δt, the pedestrian image has changed from 091 to 092, by moving for a length VΔt on the image field. If the pedestrian at a time t0 was about to come to the upper counting line 096, in order to make the passing direction judgement correctly, it is necessary for the pedestrian image 092 at a time t0+Δt to be on the central counting line 094 as shown in a middle part of FIG. 10.

To this end, it is necessary for the interval d of the counting lines to be less than a value w −VΔt, i.e., a difference between the width w in the moving direction of the pedestrian and the moving distance VΔt of the pedestrian image. This is because, if the interval d of the counting lines is greater than w−VΔt, as shown in a right part of FIG. 10, the pedestrian image 092 at a time t0+Δt would be off the central counting line 097 such that the last instance at which the pedestrian is simultaneously on the central counting line and either one of the upper and lower counting lines would be as shown in a left part of FIG. 10 indicating an opposite direction of the actual moving direction, so that there is a possibility for making an error in the direction judgement.

Thus, by setting the interval d between the counting lines to be greater than VΔt and less than w−VΔt, i.e., in a range of VΔt<d<w−VΔt, it becomes possible to make the direction judgement accurately.

Figure 11:
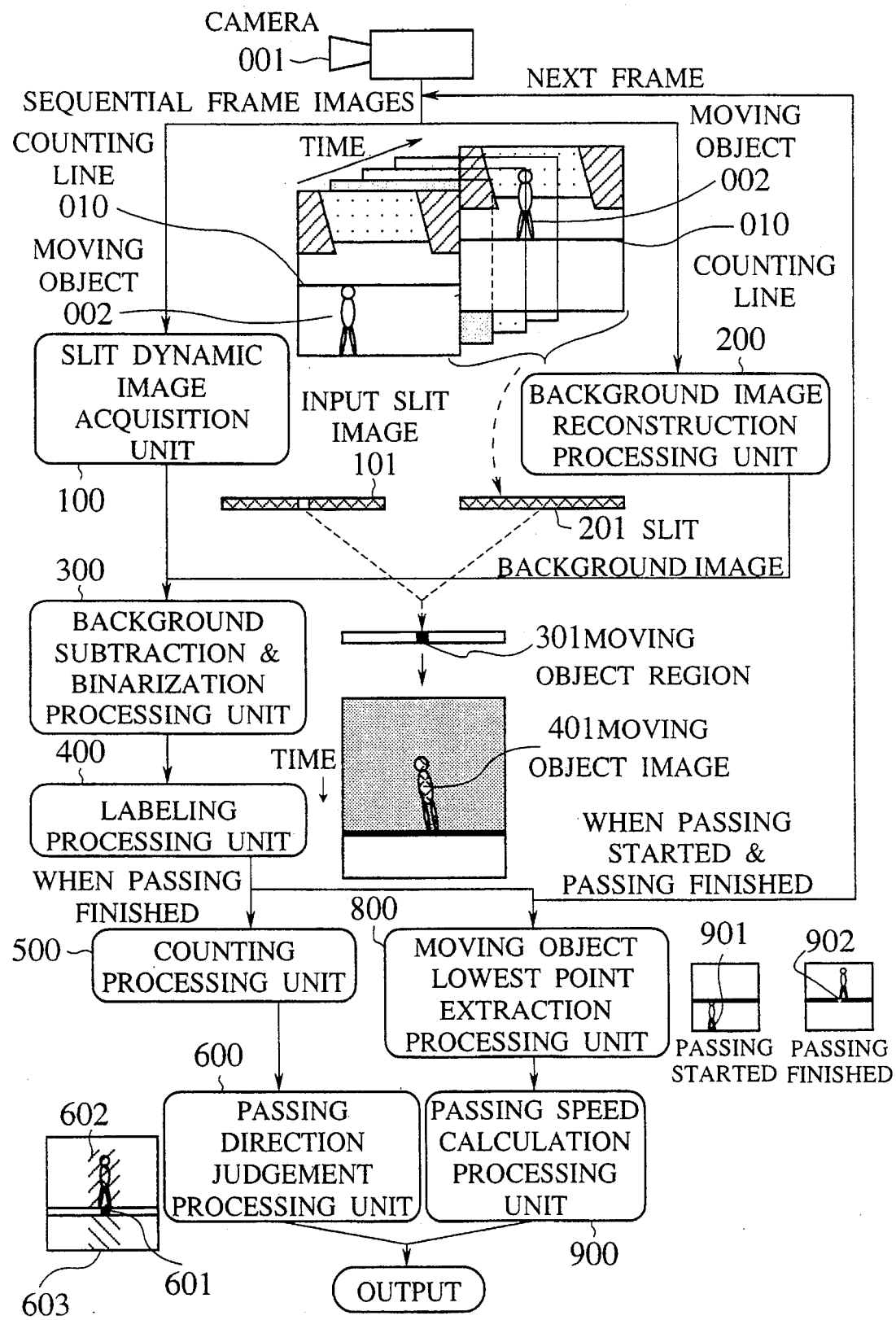
FIG. 11 is a block diagram of an apparatus realizing a method for directional counting of moving objects according to the fourth embodiment of the present invention.

Referring now to FIG. 11, the fourth embodiment of a method and an apparatus for directional counting of moving objects according to the present invention will be described in detail.

In this embodiment, the apparatus has a configuration as shown in FIG. 11, which comprises: a camera 001 for taking sequential frame images of a prescribed monitoring target location containing a moving object 002; a slit dynamic image acquisition unit 100 for setting a counting line 010 in the sequential frame images and acquiring an input slit image 101 from the counting line 010; a background image reconstruction processing unit 200 for successively updating a slit background image 201 for the counting line 010; a background subtraction and binarization processing unit 300 for applying a subtraction processing on the input slit image 101 and the slit background image 201 and applying a binarization processing on a subtraction result to obtain a subtracted and binarized image containing a moving object region 301; a labeling processing unit 400 for sequentially labeling the moving object region in time order (i.e., forming a connected region from sequentially obtained moving object regions) to obtain a space-time image containing a moving object image 401; a counting processing unit 500 for counting the moving object according to the moving object image 401 at a time of moving object passing; a passing direction judgement processing unit 600 for judging a passing direction of the moving object by using upper and lower direction judgement regions 602 and 603 set above and below a moving object region 601 at a time of moving object passing within the counting line 010 in a real space image of the prescribed monitoring target location at a time of moving object passing; a moving object lowest point extraction processing unit 800 for extracting moving object lowest points 901 and 902 at times of moving object passing started and finished; and a passing speed calculation processing unit 900 for calculating a passing speed of the moving object according to the moving object lowest points 901 and 902.

Now, the operation of this apparatus of FIG. 11 will be described.

In this embodiment, the slit dynamic image acquisition unit 100, the background image reconstruction processing unit 200, the background subtraction and binarization processing unit 300, the labeling processing unit 400, the counting processing unit 500, and the passing direction judgement processing unit 600 operates similarly as in the first embodiment described above.

In addition, the labeling processing unit 400 detects the formation start time and the extraction end time for the moving object image 401 indicating the moving object passing start and finish times, and the moving object lowest point extraction processing unit 800 extracts the moving object lowest points 901 and 902 from real space images at these moving object passing start and finish times. Here, the moving object lowest points extraction can be realized by a method for carrying out a moving object region extraction in a two dimensional region and determining the lowest point from the extracted moving object region, or a method for obtaining the lowest point of a continuous region by a contour line tracing.

Then, the passing speed calculation processing unit 900 projects the extracted moving object lowest points 901 and 902 onto a real space by utilizing a predetermined correspondence relationship between the real space image and a floor surface in a real space, and obtains positions of the moving object 002 on the floor surface in a real space at the moving object passing start and finish times. The passing speed calculation processing unit 900 then calculates the passing speed of the moving object 002 from the obtained information on the positions of the moving object 002 and a time required for passing obtained from the formation start and end times of the moving object image 401, i.e., by dividing a distance between the obtained positions by the time required for passing.

According to this fourth embodiment, it is possible to obtain a passing speed of each moving object in addition to a number and passing directions of the moving objects.

Figure 12:
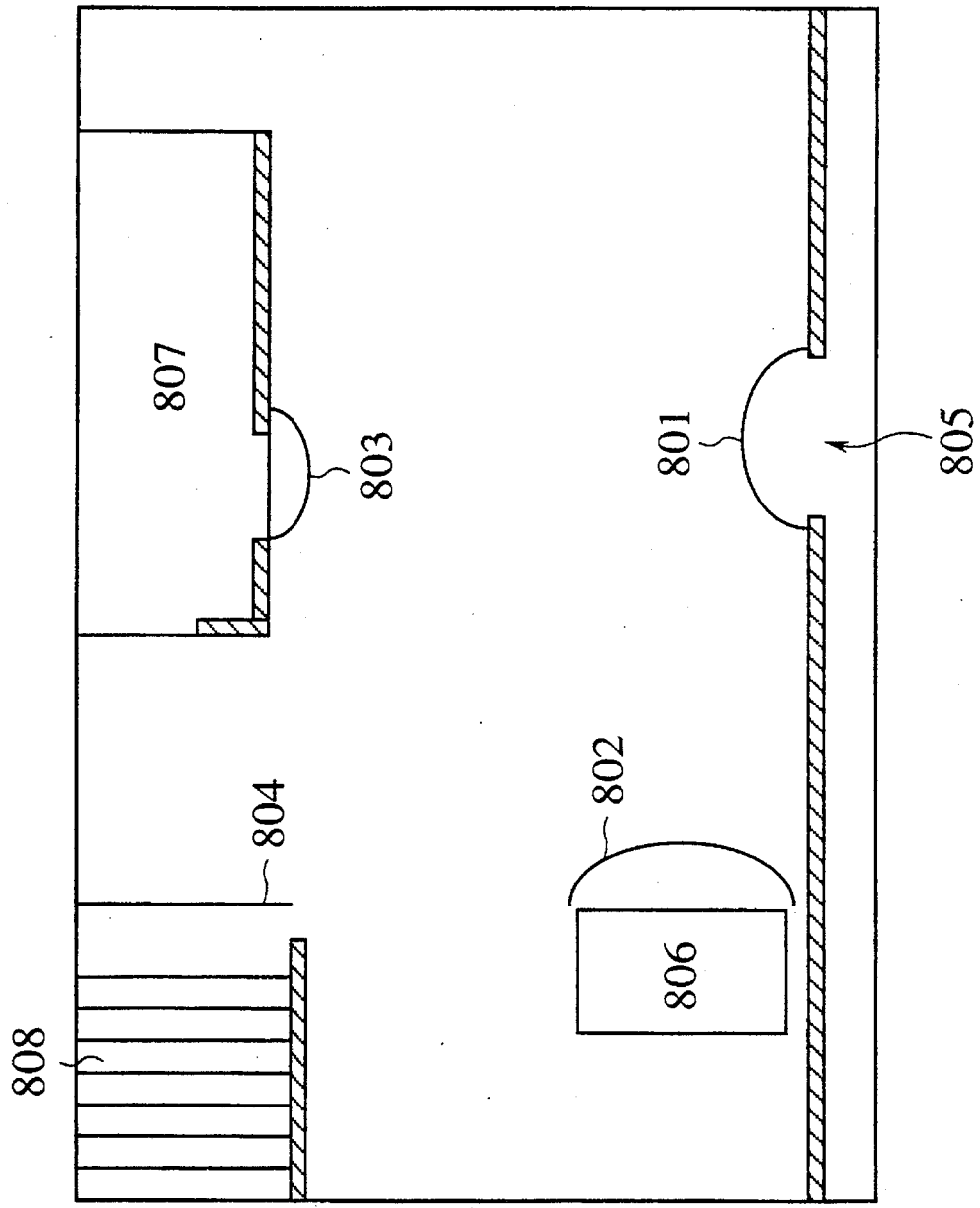
FIG. 12 is a figure for explaining the method for directional counting of moving objects according to the fifth embodiment of the present invention.

Referring now to FIGS. 12 and 13, the fifth embodiment of a method and an apparatus for directional counting of moving objects according to the present invention will be described in detail.

FIG. 12 shows an exemplary image of an entrance hall used in this embodiment, including the counting lines 801, 802, 803, and 804, which are provided in correspondence to a doorway 805, an admission 806, a rest room 807, and a stairway 808.

In this embodiment, when the pedestrian passes each counting line, the passing directional judgement as in the first embodiment described above is carried out for each counting line. Then, from a passing direction for each counting line and an information on a passing time for each counting line, it is possible to determine an order in which the pedestrian passed the counting lines, so that it is possible to obtain a trajectory of the pedestrian by forming a line joining the passing positions on the counting lines in a time order. For instance, in a case the pedestrian passed the counting line 801 from below to upper left, the counting line 802 from below to above, and the counting line 804 from right to left, it is possible to obtain the trajectory of this pedestrian as that in which the pedestrian entered from the doorway 805 went to the admission 806 first, and then, without stopping at the rest room 807, moved to the stairway 808.

In this embodiment, the apparatus has an overall configuration as shown in FIG. 13, which comprises: a camera 001 for taking sequential frame images of this entrance hall as shown in FIG. 12; directional counting units 1000A, 1000B, 1000C, and 1000D in correspondence to the counting lines 801, 802, 803, and 804, where each directional counting unit 1000 contains the slit dynamic image acquisition unit, the background image reconstruction processing unit, the background subtraction and binarization processing unit, the labeling processing unit, the counting processing unit, and the passing direction judgement processing unit similar to those of the first embodiment described above; and a trajectory determination unit 2000 for obtaining the trajectory from the passing direction judgement result and the passing time information for each counting line obtained by each directional counting unit 1000.

According to this fifth embodiment, it is possible to utilize the present invention in detection of a trajectory of a moving object in a wide ranging area.

It is to be noted that, in the above description, the terms such as "above" and "below", and "upper" and "lower" are used in a logical sense for indicating mutually opposite directions in general, so that these terms are to be construed as covering concepts of left and right or any other mutually opposite orientations in narrower senses. Also, the term "line" is used in a generic sense which covers a straight line as well as a curved line.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for directional counting of moving objects at a prescribed monitoring target location, comprising the steps of:

(a) taking sequential images of the prescribed monitoring target location;

(b) setting a counting line in an image field of the sequential images, and acquiring a dynamic image formed by time changing pixel values of a series of pixels forming the counting line from each sequential image;

(c) obtaining a background image by successively updating the pixel values of the series of pixels forming the counting line in states in which a moving object is not passing over the counting line;

(d) applying a subtraction processing on the dynamic image and the background image, and then applying a binarization processing to extract a moving object region;

(e) forming a moving object image by sequentially labeling moving object region in time order;

(f) counting a number of moving objects passing through the prescribed monitoring target location according to the moving object image; and (g) setting upper and lower direction judgement regions above and below the counting line in the image field of the sequential images, and judging a passing direction of each moving object by judging one of the upper and lower direction judgement regions in which the moving object is present at a time of a formation start/end time of the moving object image.

2. The method of claim 1, wherein the upper and lower direction judgement regions are at least one upper line and at least one lower line formed by a series of pixels above and below the counting line in the image field of the sequential images.

3. The method of claim 2, wherein an interval d between the upper line and the counting line and between the counting line and the lower line is in a range of $V\Delta t < d < w - V\Delta t$, where V is an average speed of the moving objects passing in the image field, w is an average width of the moving objects along a moving direction in the image field, and $\Delta t$ is a time interval for taking successive ones of the sequential images.

4. The method of claim 2, further comprising the step of determining a moving direction of each moving object from passing positions of the moving object on the counting line, the upper line, and the lower line, and a judgement result for the passing direction.

5. The method of claim 1, further comprising the step of determining a moving direction of each moving object from a passing position of the moving object on the counting line, a predetermined central position of dispersion/contraction of a flow of the moving objects, and a judgement result for the passing direction.

6. The method of claim 1, further comprising the step of determining a passing speed of each moving object from a time taken for passing by each moving object obtained from a formation start time and a formation end time of the moving object image, and a position change of each moving object between the formation start time and the formation end time obtained from positions of the moving object in the image field of the sequential images at the formation start time and the formation end time.

7. The method of claim 6, wherein the positions of the moving object in the image field of the sequential images at the formation start time and the formation end time are given by lowest points of the moving object in the image field of the sequential images at the formation start time and the formation end time.

8. The method of claim 1, further comprising the step of executing the steps (b) to (g) for a plurality of places in the image field of the sequential images, and determining a trajectory of each moving object according to judgement results for the passing direction obtained for said plurality of places.

9. The method of claim 1, wherein the step (f) counts the number of moving objects by comparing an area of the moving object image with a prescribed unit area.

10. The method of claim 1, wherein the step (g) judges the passing direction of each moving object as a direction opposite to said one of the upper and lower direction judgement regions in which the moving object is present at a time of the formation start time of the moving object image, or as a direction toward said one of the upper and lower direction judgement regions in which the moving object is present at a time of the formation end time of the moving object image.

11. An apparatus for directional counting of moving objects at a prescribed monitoring target location, comprising:

imaging means for taking sequential images of the prescribed monitoring target location;

dynamic image acquisition means for setting a counting line in an image field of the sequential images, and acquiring a dynamic image formed by time changing pixel values of a series of pixels forming the counting line from each sequential image;

background image reconstruction means for obtaining a background image by successively updating the pixel values of the series of pixels forming the counting line in states in which a moving object is not passing over the counting line;

moving object region extraction means for applying a subtraction processing on the dynamic image and the background image, and then applying a binarization processing to extract a moving object region;

moving object image formation means for forming a moving object image by sequentially labeling the moving object region in time order;

counting means for counting a number of moving objects passing through the prescribed monitoring target location according to the moving object image; and passing direction judgement means for setting upper and lower direction judgement regions above and below the counting line in the image field of the sequential images, and judging a passing direction of each moving object by judging one of the upper and lower direction judgement regions in which the moving object is present at a time of a formation start/end time of the moving object image.

12. The apparatus of claim 11, wherein the passing direction judgement means sets the upper and lower direction judgement regions as at least one upper line and at least one lower line formed by a series of pixels above and below the counting line in the image field of the sequential images.

13. The apparatus of claim 12, wherein the passing direction judgement means sets the upper line and the lower line such that an interval d between the upper line and the counting line and between the counting line and the lower line is in a range of $V\Delta t < d < w - V\Delta t$, where V is an average speed of the moving objects passing in the image field, w is an average width of the moving objects along a moving direction in the image field, and $\Delta t$ is a time interval for taking successive ones of the sequential images.

14. The apparatus of claim 12, further comprising moving direction judgement means for determining a moving direction of each moving object from passing positions of the moving object on the counting line, the upper line, and the lower line, and a judgement result for the passing direction.

15. The apparatus of claim 11, further comprising moving direction judgement means for determining a moving direction of each moving object from a passing position of the moving object on the counting line, a predetermined central position of dispersion/contraction of a flow of the moving objects, and a judgement result for the passing direction.

16. The apparatus of claim 11, further comprising passing speed calculation means for determining a passing speed of each moving object from a time taken for passing by each moving object obtained from a formation start time and a formation end time of the moving object image, and a position change of each moving object between the formation start time and the formation end time obtained from positions of the moving object in the image field of the sequential images at the formation start time and the formation end time.

17. The apparatus of claim 16, wherein the positions of the moving object in the image field of the sequential images at the formation start time and the formation end time are given by lowest points of the moving object in the image field of the sequential images at the formation start time and the formation end time.

18. The apparatus of claim 11, wherein the dynamic image acquisition means, the background image reconstruction means, the moving object region extraction means, the moving object image formation means, the counting means and the passing direction judgement means are operating with respect to one place in the image field of the sequential images, and the apparatus further comprises:

another dynamic image acquisition means for setting another counting line at another place in an image field of the sequential images, and acquiring another dynamic image formed by time changing pixel values of a series of pixels forming said another counting line from each sequential image;

another background image reconstruction means for obtaining another background image by successively updating the pixel values of the series of pixels forming said another counting line in states in which a moving object is not passing over said another counting line;

another moving object region extraction means for applying a subtraction processing on said another dynamic image and said another background image, and then applying a binarization processing to extract another moving object region;

another moving object image formation means for forming another moving object image by sequentially labeling said another moving object region in time order;

another counting means for counting a number of moving objects passing through said another place in the sequential images of the prescribed monitoring target location according to said another moving object image;

another passing direction judgement means for setting another upper and lower direction judgement regions above and below said another counting line in the image field of the sequential images, and judging a passing direction of each moving object by judging one of said another upper and lower direction judgement regions in which the moving object is present at a time of a formation start/end time of said another moving object image; and trajectory determination means for determining a trajectory of each moving object according to judgement results for the passing direction obtained for said one place and said another place.

19. The apparatus of claim 11, wherein the counting means counts the number of moving objects by comparing an area of the moving object image with a prescribed unit area.

20. The apparatus of claim 11, wherein the passing direction judgement means judges the passing direction of each moving object as a direction opposite to said one of the upper and lower direction judgement regions in which the moving object is present at a time of the formation start time of the moving object image, or as a direction toward said one of the upper and lower direction judgement regions in which the moving object is present at a time of the formation end time of the moving object image.

* * * * *